United States Patent [19]

Iwano et al.

[11] Patent Number: 4,952,245
[45] Date of Patent: Aug. 28, 1990

[54] NACREOUS PIGMENT CONTAINING A DYE AND COSMETIC COMPOSITION COMPRISING THE SAME

[75] Inventors: Kazuko Iwano, Tokyo; Momoko Suzumeji, Kashiwa, both of Japan

[73] Assignee: Kao Corporation, Tokyo, Japan

[21] Appl. No.: 379,073

[22] Filed: Jul. 13, 1989

[30] Foreign Application Priority Data

Jul. 22, 1988 [JP] Japan ................................ 63-182871

[51] Int. Cl.$^5$ ................................................ C09C 1/62
[52] U.S. Cl. .................................... 106/404; 106/415; 106/493
[58] Field of Search ...................... 106/404, 415, 493

[56] References Cited

U.S. PATENT DOCUMENTS

| | | | |
|---|---|---|---|
| 2,394,843 | 2/1946 | Cooke et al. | 106/404 |
| 3,053,676 | 9/1962 | Higbee | 106/404 |
| 4,047,969 | 9/1977 | Armanini et al. | 106/457 |
| 4,084,983 | 4/1978 | Bernhard et al. | 106/402 |

FOREIGN PATENT DOCUMENTS

| | | |
|---|---|---|
| 53-46331 | 6/1977 | Japan . |
| 51-17910 | 1/1986 | Japan . |
| 169716 | 7/1987 | Japan . |

Primary Examiner—Paul Lieberman
Assistant Examiner—Willie J. Thompson
Attorney, Agent, or Firm—Oblon, Spivak, McClelland, Maier & Neustadt

[57] ABSTRACT

A nacreous pigment containing a dye comprising a nacreous pigment having an interference color which surface is coated with an insoluble salt of an acid dye and a basic aluminum salt is disclosed. A cosmetic composition comprising said nacreous pigment containing a dye is also disclosed. The nacreous pigment containing a dye has an excellent brightness, a high chroma, a wide variety of color, a high color concentration, and also possesses high safety and excellent stability.

5 Claims, No Drawings

NACREOUS PIGMENT CONTAINING A DYE AND COSMETIC COMPOSITION COMPRISING THE SAME

BACKGROUND OF THE INVENTION

1. Field of the Invention

This invention relates to a nacreous pigment containing a dye, which has an excellent brightness, a high chroma, a wide variety of color, a high color concentration, and also possesses high safety and excellent stability. The invention also relates to a cosmetic composition comprising said pigment.

2. Description of the Background

Nacreous pigments have widely been used in order to provide various products with gloss such as pearl- or gold-like gloss and the like. Such products include cosmetics, paints, plastics, inks, colors, miscellaneous goods for daily use, ornaments, and the like. Natural fish scale leaves, bismuth oxychloride, titanium mica, and the like are usually used as a nacreous pigment. From the view point of light resistance, stability, safety, dispersibility, gloss effect, cost performance, and the like, titanium mica is widely used.

Titanium mica can be prepared, for example, by the method described in Japanese Patent Publication No. 25644/1968. The titanium mica disclosed therein is such that is coated with titanium dioxide on the surface of mica particles. Interference colors of silver, gold, red, blue, green, or the like can be obtained depending on the amount of titanium oxide coated. Nevertheless, the external color actually observed is almost white, and different from these interference colors. In the method of this publication, externally distinct color cannot be obtained, although excellently pearly luster is obtainable.

There have been some attempts to obtain various external colors by using general organic or inorganic color pigments mixed with titanium mica. However, since titanium mica has a scaly form and its particle size is much larger than that of ordinary pigments, simple mixing of these pigments with titanium mica entails various problems. For instance, it is difficult to mix titanium mica uniformly with an ordinary pigment because of the differences in their particle size, specific gravity, shape, and surface properties. When mixed, separation is apt to take place, resulting in color bleeding.

To obtain a nacreous pigment having an excellent external color, therefore, a method of making a complex of titanium mica and an ordinary inorganic or organic pigment has been developed.

For making a complex of an inorganic pigment and a nacreous pigment, there are known methods including: (1) the surface of a nacreous pigment is coated with iron oxide, nickel oxide, cobalt oxide, copper oxide, chromium oxide, or the like, which possesses its own color (Japanese Patent Publication No. 25644/1968); (2) a nacreous pigment is coated with a precursor material of Prussian blue, which is then treated to convert into Prussian blue on the surface of the nacreous pigment (Japanese Patent Laid-open No. 46331/1978). These methods, however, have drawbacks including limitation to the color of the inorganic pigment, insufficient distinctness, unavailability of a color of high concentration, and the like.

On the other hand, for making a complex of an organic pigment and a nacreous pigment, there are conventionally known methods such as a method of causing an aluminum hydroxide layer to adhere to the surface of a nacreous pigment, followed by fixing of a dye on the surface of the nacreous pigment using the dye having a chelating agent and a group capable of forming a salt of very low solubility (Japanese Patent Laid-open No. 17910/1976; a method of fixing D & C Red No. 30 on the surface of a nacreous pigment using various methods (Japanese Patent Laid-open No. 169716/1987), and the like. These methods, however, have drawbacks including limitation to the color of the inorganic pigment, insufficient coloration, unavailability of a color of high concentration, and the like.

The present inventors made extensive and earnest studies to solve the above problems and, as a result, found that a nacreous pigment containing a dye, which has an excellent distinctness, a high color concentration, and which does not entail color bleeding when used, could be obtained by coating an insoluble salt of an acid dye and a basic aluminum salt on the surface of a nacreous pigment having an interference color. The inventors also found that a cosmetic composition comprising said nacreous pigment containing a dye possessed excellent external distinctness and luster. These findings have led to the completion of the invention.

SUMMARY OF THE INVENTION

Accordingly, an object of this invention is to provide a nacreous pigment containing a dye comprising a nacreous pigment having an interference color which surface is coated with an insoluble salt of an acid dye and a basic aluminum salt, and also to provide a cosmetic composition comprising said nacreous pigment containing a dye.

Other objects, features and advantages of the invention will hereinafter become more readily apparent from the following description.

DETAILED DESCRIPTION OF THE INVENTION AND PREFERRED EMBODIMENTS

The nacreous pigment containing a dye of this invention can be prepared by using as raw materials a nacreous pigment having an interference color, an acid dye, and a basic aluminum salt and fixing the insoluble salt obtained in the reaction of the acidic dye and the basic aluminum salt on the surface of the nacreous pigment having an interference color.

As pigments having an interference color, natural fish scale leaves, bismuth oxychloride, titanium mica, and the like are preferred. Among them, titanium mica is particularly preferred.

Titanium mica having an interference color can be prepared according to conventional methods. It can be prepared, for example, by the following processes: (1) Micas of selected sizes are suspended in a dilute solution of titanil sulfate which is strongly acidic. The suspension is quickly heated to 90°-100° C. and held at that temperature for 2-3 hours. A hydrated titanium dioxide layer thus precipitates on the mica substrate. Alternatively, the same product can be prepared by suspending mica in hot water, rapidly adding strongly acidic titanil sulfate solution to the hot solution, and heating the solution to boil until the hydrolysis is completed. (2) The product thus obtained is subjected to filtration. The precipitate is washed and separated at pH 5. The collected substances are dried at 80° C. The dried substances are calcined at 950° C. in the atmosphere for one hour to obtain titanium mica which is a nacreous pigment having an interference color.

The titanium mica thus obtained includes many, relatively large platelet particles having a diameter of 5–50 μm, and these large platelet particles are provided with a titanium oxide layer having a high refractive index (N=2.5) on the surface of mica having a low refractive index (N=1.5–1.6). This structure brings about regularly multiple reflection accompanied by slight scattering of light. This reflection is observed as a pearly luster. When the titanium mica is used, the interference colors of silver, gold, red, violet, blue, or green are obtainable by controlling the thickness of the titanium oxide film in the range of 60 to 170 μm. The color of the nacreous pigments in powder form having these interference colors as well as the color when these pigments are applied to a white base, appears to be almost white due to the transmittance of the complementary colors. These titanium micas are commercially available as an iridescence color type or an interference pearl type, which may be used for the invention.

There is no specific restriction as to the kinds of acid dyes to be used in this invention inasmuch as they are capable of reacting with a basic aluminum salt to produce an insoluble salt. Acid dyes or dyes for anodized Aluminum which are usually used for cosmetic compositions can be used in this invention.

Given as examples of acid dyes are legal dyestuffs such as FD & C Red No. 2, FD & C Red No. 3, CI Acid Red 18, D & C Red No. 28, CI Acid Red 94, CI Acid Red 52, FD & C Yellow No. 5, FD & C Yellow No. 6, FD & C Green No. 3, FD & C Blue No. 1, D & C Red No. 6, D & C Red No. 8, FD & C Blue No. 2, D & C Red No. 33, D & C Red No. 22, Acid Red 92, CI Acid Red 94, D & C Orange No. 4, D & C Orange No. 11, D & C Yellow No. 8, D & C Yellow No. 10, D & C Green No. 5, D & C Green No. 8, D & C Green No. 4, D & C Blue No. 4, CI Acid Violet No. 9, Food Red No. 6, CI Acid Red No. 26, FD & C Red No. 4, Acid Red No. 8, CI Acid Orange 20, CI Acid Yellow 40, Ext D & C Yellow No. 7, Ext D & C Yellow No. 1, CI Acid Yellow 11, CI Acid Green 3, Ext D & C Violet No. 2, and the like. They may be used individually or in combination according to the desired color tone.

Given as examples of dyes for anodized Aluminum are dyestuffs such as CI Acid Yellow 136, CI Acid Yellow 167, CI Acid Orange 102, CI Acid Orange 125, CI Acid Orange 126, CI Acid Red 267, CI Acid Red 329, CI Acid Red 330, CI Acid Red 331, CI Acid Red 332, CI Acid Violet 108, CI Acid Blue 243, CI Acid Blue 244, CI Acid Blue 245, CI Acid Blue 246, CI Acid Green 82, CI Acid Green 94, and the like. They may be used individually or in combination according to the desired color tone.

When the raw nacreous pigment is coated with an acid dye having a coincident color with an interference color of the nacreous pigment according to this invention, the nacreous pigment containing the dye exhibits an externally distinct color and a highly concentrated color. Such combinations, for example, a nacreous pigment having a gold interference color in combination with an acid yellow dye or a nacreous pigment having a red interference color in combination with an acid red dye are particularly desirable.

It is also possible to use the pigment in combination with acid dyes having a color different from the interference color of a pigment. For example, a titanium mica having a gold interference color can be coated with an acid dye of a red color, a blue color, or a green color, and a titanium mica having a red interference color can be coated with an acid dye having a yellow color, a blue color, or a green color. Also, a titanium mica having a blue or a green interference color can be respectively coated with an acid dye of a color different from the interference color of each pigment. These combinations bring about specific dual-color effects due to the dual color-developing functions of light interference and light absorption.

Given as examples of basic aluminum salts used in this invention are, for example, the compounds represented by the following formula:

$$Al_n(OH)_m X_l$$

wherein X represents Cl, Br, I, or $CH_3COO$, and n, m, and l denote numbers satisfying the equation, $3n=m+l$. Among them, those having good solubility in water producing a solution of a weakly acidic pH value are preferable. Particularly preferable examples are $Al_2(OH)_5Cl$, $Al(OH)(CH_3COO)_2$.

There are no restrictions to the process for preparing nacreous pigments containing a dye of this invention. Nacreous pigments can be prepared, for example, by mixing a nacreous pigment having an interference color in an aqueous medium, collecting the colored precipitates obtained, and drying them.

An acid dye is formulated in the amount corresponding basically to the positive electric charge of a pigment slurry consisting of a nacreous pigment, a basic aluminum salt, and an acid. If the acid dye amount is excessive, unreacted dye remains, resulting in its considerable loss upon washing. On the other hand, if the acid dye amount is less than what is necessary, the homogeneous precipitates of the desired pigment cannot be prepared. It is usually desirable to formulate 0.5 to 2.3 parts by weight of an acid dye per 1 part by weight of a basic aluminum salt. The appropriate amount is, however, determined depending on the molecular weight, the number of water-soluble groups, and the purity of the acid dye used. In addition, it is desirable that an acid dye be formulated in an amount of 0.5 to 20% by weight of a nacreous pigment. If the amount is less than the necessary amount, sufficient color concentration cannot be imparted. While, although the larger the amount, the greater the color concentration, the color concentration is not improved in proportion to the amount formulated, and the dissolution resistance is apt to be reduced. The particularly preferable amount is thus in the range of 1 to 10% by weight.

There is no restriction on the mixing order of these components. However, it is desirable to formulate a nacreous pigment, a basic aluminum salt, and an acid dye in this order. Specifically, 10 to 30% by weight of a nacreous pigment containing a dye is suspended in water. To the solution is added a basic aluminum salt solution with stirring. Acids such as HCl, $HNO_3$, $CH_3COOH$, and the like, or salts such as $AlCl_3$, $Al(NO_3)_3$, and the like are added to the mixture as required to adjust the pH 3 to 7, preferably 4.0 to 5 0. An acid dye solution is added to the suspension to insolubilize the acid dye. The acid dye is thus made into a pigment having a primary particle diameter of less than 0.2 μm. The temperature when the acid dye is added is in the range of room temperature to 80° C., preferably 40° to 60° C.

After the insoluble salt is produced, the mixture is stirred at the same temperature for 1 to 3 hours. After the reaction is completed, the precipitate thus obtained is separated by filtration and thoroughly washed with water. The precipitate is further washed with acetone or alcohol and dried. It is desirable that the drying be performed in a condition that the precipitate does not make strong aggregation. For example, the drying condition, at a temperature of 50° to 80° C. under atmospheric pressure or reduced pressure, is preferable.

The products of this invention do not gel, are readily filtered, do not produce hard cakes upon drying, and thus are easy pulverized into fine particles.

In addition, the nacreous pigments containing a dye of this invention are soft powders and readily free-flowing.

The nacreous pigments containing a dye of this invention exhibit an externally distinct and highly concentrated color. Cosmetic compositions comprising these pigments are provided with both an externally distinct color and a pearly luster.

Enumerated as cosmetic compositions comprising the nacreous pigment containing a dye of this invention are lipstick, eye shadow, rouge, nail enamel, eye liner, eye pencil, mascara, and the like. In these cosmetic compositions, the nacreous pigment containing a dye of this invention is usually formulated in an amount of 0.5 to 50% by weight, preferably 1 to 40% by weight depending on the kind of cosmetic, the composition of the cosmetic, the kind of pigment, and the like.

For cosmetic compositions of this invention, known cosmetic base substances may be formulated. Besides the above pigments, these substances include, for example, loading pigments such as kaolin, nylon powder, and the like, inorganic pigments such as titanium oxide, zinc white, iron oxide, pearl, and the like, and organic pigments such as D & C Red No. 7, D & C Red No. 30, FD & C Yellow No. 5 aluminum lake, and the like. Also, powders, the surfaces of which are provided with known hydrophobic treatment such as a treatment by silicone, metal soap, N-acylgultamic acid, or the like, can be used. Further, given as oily agents used in this invention are hydrocarbons such as solid-like or liquid paraffin, solid paraffin, microcrystalline wax, petrolatum, ceresin, ozocerite or montan wax, and the like; naturally available animal or vegetable oils, fats, or waxes, such as olive oil, natural wax, carnauba wax, lanolin, spermaceti, and the like; fatty acids or their esters such as stearic acid, palmitic acid, oleic acid, monostearic glyceride, distearic glyceride, monooleic glyceride, isopropyl myristate, isopropyl stearate, butyl stearate, and the like; and alcohols such as ethyl alcohol, isopropyl alcohol, cetyl alcohol, stearyl alcohol, palmitic alcohol, hexyl or dodecyl alcohol, and the like; as well as polyhydric alcohols possessing moisturizing effect, such as glycol, glycerol, sorbitol, and the like.

Other features of the invention will become apparent in the course of the following description of the exemplary embodiments which are given for illustration of the invention and are not intended to be limiting thereof.

EXAMPLES

Example 1

10.0 g of titanium mica having a red interference color (Timiron Super Red manufactured by Merck Co., Ltd.) was suspended in 10-fold by weight of purified water. To the suspension was added a solution of 0.35 g of basic aluminum chloride (trade name: Locron-P, formula: $Al_2(OH)_5Cl.2-3H_2O$, manufactured by Hoechst Corp.) in 20 ml of water with stirring. After adjusting the pH to 4.0 using 1N hydrochloric acid, the suspension was heated to 60° C., to which was gradually added 0.7 g of Phloxine B (D & C Red No. 28 manufactured by Kishi Chemical Co., Ltd.) dissolved in 80 ml of purified water with stirring. Insoluble dye substances were thus produced on the surface of titanium mica. The solution containing the insoluble substances was left to stand. After the supernatant was removed, the precipitate was filtered, washed with water and ethanol, and dried at 80° C. in vacuo to obtain a nacreous pigment which exhibited a distinct red color in powdery form as well as when applied.

Example 2

To the suspension containing 10.0 g of the same titanium mica as used in Example 1 dissolved in 10-fold by weight of purified water was added 0.4 g of basic aluminum chloride [$Al_2(OH)_5Cl.2-3H_2O$] dissolved in 20 ml of water with stirring After adjusting the pH to 4.0 using 1N hydrochloric acid, the suspension was heated to 60° C., to which was gradually added 0.45 g of Erythrosine (FD & C Red No. 3 manufactured by Kishi Chemical Co., Ltd.) dissolved in 45 ml of purified water with stirring. Insoluble dye substances were thus produced on the titanium mica. The solution containing the insoluble substances was left to stand. After the supernatant was removed, the precipitate was filtered, washed with water and ethanol, and dried at 60° C. to obtain a nacreous pigment which exhibited a distinct red color in powdery form as well as when applied.

Example 3

To the suspension containing 10.0 g of the same titanium mica having the same red interference color with that used in Example 1 dissolved in 20-fold by weight of purified water was added 0.4 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 60° C., to which was gradually added 0.4 g of New Coccine (C.I. Acid Red 18 manufactured by Kishi Chemical Co., Ltd.) dissolved in 40 ml of purified water with stirring. Insoluble dye substances were thus produced on the surface of the titanium mica. The solution containing the insoluble substances was left to stand. After the supernatant was removed, the precipitate was filtered, washed with water and ethanol, and dried at 60° C. in vacuo to obtain a nacreous pigment which exhibited a distinct red color in powdery form as well as when applied.

Example 4

To the suspension containing 10.0 g of titanium mica having the same red interference color with that used in Example 1 dissolved in 20-fold by weight of purified water was added 0.4 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 40° C., to which was gradually added 0.2 g of Lithol Rubine B (D & C Red No. 16 manufactured by Kishi Chemical Co. Ltd.) dissolved in 20 ml of purified water with stirring. Insoluble dye substances were thus produced on the surface of the titanium mica. The solution containing the insoluble substances was left to stand. After the supernatant was removed, the precipitate was filtered, washed with water and ethanol, and dried at 80° C. to obtain a nacreous pigment which exhibited a distinct red color in powdery form as well as when applied.

Example 5

10.0 g of titanium mica having a gold interference color (Timiron Super Gold manufactured by Merck Co., Ltd.) was suspended in 20-fold by weight of purified water. To the suspension was added 0.4 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 60° C., to which was added 0.8 g of Tartrazine (FD & C Yellow No. 5 manufactured by Kishi Chemical Co., Ltd.) dissolved in 80 ml of purified water with stirring. Insoluble dye substances were thus produced on the surface of the titanium mica. The solution containing the insoluble substances was left to stand. After the supernatant was removed, the precipitate was filtered, washed with water and ethanol, and dried at 80° C. to obtain a nacreous pigment which exhibited a distinct yellow color in powdery form as well as when applied.

Example 6

10.0 g of titanium mica having a blue interference color (Timiron Super Blue manufactured by Merck Co., Ltd.) was suspended in 10-fold by weight of purified water. To the suspension was added 0.4 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 60° C., to which was gradually added 0.69 g of Brilliant Blue-FCF (FD & C Blue No. 1 manufactured by Kishi Chemical Co., Ltd.) dissolved in 69 ml of purified water with stirring Insoluble dye substances were thus produced on the surface of the titanium mica. The solution containing the insoluble substances was left to stand. After the supernatant was removed, the precipitate was filtered, thoroughly washed with water and ethanol, and dried at 80° C. in vacuo to obtain a nacreous pigment which exhibited a distinct blue color in powdery form as well as when applied.

Example 7

10.0 g of titanium mica having a blue interference color (Timiron Super Green manufactured by Merck Co., Ltd.) was suspended in 15-fold by weight of purified water. To the suspension was added 0.4 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 60° C., to which was gradually added 0.7 g of Fast Green (FD & C Green No. 3 manufactured by Kishi Chemical Co., Ltd.) dissolved in 80 ml of purified water with stirring. Insoluble dye substances were thus produced on the surface of the titanium mica. The solution containing the insoluble substances was left to stand. After the supernatant was removed, the residue was filtered, washed with water and ethanol, and air-dried to obtain a nacreous pigment which exhibited a distinct green color in powdery form as well as when applied.

Example 8

10.0 g of titanium mica having a gold interference color (Timiron Super Gold manufactured by Merck Co., Ltd.) was suspended in 10-fold by weight of purified water. To the suspension was added 0.35 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 60° C., to which was gradually added 0.7 g of Phloxine B (D & C Red No. 28 manufactured by Kishi Chemical Co., Ltd.) dissolved in 80 ml of purified water with stirring. Insoluble dye substances were thus produced on the surface of the titanium mica. The solution containing the insoluble substances was left to stand. After the supernatant was removed, the precipitate was filtered, washed with water and ethanol, and dried at 80° C. in vacuo to obtain a nacreous pigment which exhibited a distinct yellowish red color in powdery form as well as when applied.

Example 9

10.0 g of titanium mica having a blue interference color (Timiron Super Blue manufactured by Merck Co., Ltd.) was suspended in 10-fold by weight of purified water. To the suspension was added 0.35 g of basic aluminum chloride [$Al_2(OH)_5Cl.2-3H_2O$] dissolved in 20 ml of water with stirring. After adjusting the pH to 4.0 using 1N hydrochloric acid, the suspension was heated to 60° C., to which was gradually added 0.7 g of Phloxine B (D & C Red No. 28 manufactured by Kishi Chemical Co., Ltd.) dissolved in 80 ml of purified water with stirring. Insoluble dye substances were thus produced on the surface of the titanium mica. The solution containing the insoluble substances was left to stand. After the supernatant was removed, the precipitate was filtered, washed with water and ethanol, and dried at 80° C. in vacuo to obtain a nacreous pigment which exhibited a distinct bluish red color in powdery form.

Comparative Example 1

A red nacreous pigment was obtained according to the same procedures as in Example 1 except that a white titanium mica (Timiron MP115 manufactured by Merck Co., Ltd.) was used instead of titanium mica having an interference color as used in Example 1.

Comparative Example 2

A red nacreous pigment was obtained according to the same procedures as in Example 2 except that the same white titanium mica as in Comparative Example 1 was used instead of titanium mica having an interference color as used in Example 2.

Comparative Example 3

A red nacreous pigment was obtained according to the same procedures as in Example 3 except that the same white titanium mica as in Comparative Example 1 was used instead of titanium mica having an interference color as used in Example 2.

Comparative Example 4

A red nacreous pigment was obtained according to the same procedures as in Example 4 except that the same white titanium mica as in Comparative Example 1 was used instead of titanium mica having an interference color as used in Example 4.

Comparative Example 5

A yellow nacreous pigment was obtained according to the same procedures as in Example 5 except that the same white titanium mica as in Comparative Example 1 was used instead of titanium mica having an interference color as used in Example 5.

Comparative Example 6

A blue nacreous pigment was obtained according to the same procedures as in Example 6 except that the same white titanium mica as in Comparative Example 1 was used instead of titanium mica having an interference color as used in Example 6.

Comparative Example 7

A green nacreous pigment was obtained according to the same procedures as in Example 7 except that the same white titanium mica as in Comparative Example 1 was used instead of titanium mica having an interference color as used in Example 7.

Comparative Example 8

0.901 g of titanium mica having a red interference color as used in Example 1 and 0.6087 g of jojoba/chlodaran (50/50) paste containing 50% by weight of aluminum lake of Phloxine B (pure color substance: 20.7% by weight) were dispersed in VS Medium (manufactured by Dainichi Seika Co., Ltd.), with the total weight of the dispersion being 50 g. The dispersion thus prepared was applied on black-white matching paper using a 0.101 mm applicator to form a film. In this example, the ratio by weight of titanium mica/pure color substance was the same as that of Example 1.

Comparative Example 9

Using 0.901 g of white titanium mica as used in comparative Example 1 and 0.6087 g of aluminum lake paste of Phloxine, an applied film was prepared according to the same procedures as in Comparative Example 8.

Comparative Example 10

Commercially sold titanium mica having a red interference color (Timiron Super Red manufactured by Merck Co., Ltd.)

Comparative Example 11

A red nacreous pigment was prepared using as starting materials titanium mica and Phloxine B used in Example 1 according to the same method as in Japanese Patent Laid-open No. 17910/1976.

Comparative Example 12

Commercially sold titanium mica having an yellow interference color (Timiron Super Gold manufactured by Merck Co., Ltd.)

Comparative Example 13

Commercially sold titanium mica having a blue interference color (Timiron Super Blue manufactured by Merck Co., Ltd.)

Comparative Example 14

Commercially sold titanium mica having a green interference color (Timiron Super Green manufactured by Merck Co., Ltd.)

Other comparative examples which are all available in the market.

Product A: Cloisone Red manufactured by Mearl Co., ltd.

Product B: Gemtone Ruby manufactured by Mearl Co., Ltd.

Product C: Imperial Red manufactured by Merck Co., Ltd.

Product D: Pearl Color R226 (10%) manufactured by Daito Chemical Industries Ltd.

Product E: Daichrona RY manufactured by Merck Co., Ltd.

Product F: Daichrona RB manufactured by Merck Co., Ltd.

Example 10

Nail enamel

| (Composition A) | |
|---|---|
| Cellulose nitrate | 20.0 g |
| Alkyd resin | 15.0 g |
| Camphor | 3.0 g |
| Plasticizer | 6.0 g |
| Butyl acetate | 23.0 g |
| Ethyl acetate | 9.0 g |
| Isopropanol | 7.0 g |
| Butanol | 2.0 g |
| Toluene | 4.8 g |
| (Composition B) | |
| Pigment prepared in Example 1 | 2.0 g |
| Modified organic bentonite | 1.2 g |

Preparation

The components of Composition A were mixed and dissolved. The components of Composition B were added to the solution to prepare the target nail enamel possessing an external distinctness and pearly luster.

Example 11

Lipstick

| (Composition) | |
|---|---|
| Carnauba wax | 2 g |
| Ceresin | 7 g |
| Candelilla wax | 5 g |
| Microcrystalline wax | 5 g |
| Bees wax | 5 g |
| Lanolin | 4 g |
| Castor oil | 40 g |
| Hexadecyl alcohol | 15 g |
| Cane sugar pentastearate | 5 g |
| Pigment prepared in Example 1 | 12 g |
| Anti-oxidant & perfume | Appropriate amount |

Preparation

The components, except for the pigment of the above composition, were mixed and heated to 90° C. for dissolution. The pigment was added to the solution to prepare the target lipstick possessing an external distinctness and pearly luster. The lipstick also possessed a coincidence in its external color and its applied color.

Example 12

Powder eye shadow

| (Composition) | |
|---|---|
| Talc | 15 g |
| Sericite | 30 g |

-continued

| (Composition) | |
|---|---|
| Pigment prepared in Example 1 | 38 g |
| Marine blue | 5 g |
| Iron oxide | 2 g |
| 2-ethylhexanoic acid triglyceride | 6 g |
| Lanolin | 5 g |
| Polyethylene wax | 4 g |

Preparation

The powdery components in the above composition were mixed with stirring using a blender. The powdery mixture was sprayed with the oily components which had bee uniformly dissolved by heating, further stirred, and then pulverized and compression-molded with a forming machine to prepare a solid powder eye shadow. The non-garish eye shadow obtained had a natural finish exhibiting a distinctness externally as well as when applied.

Experimental Example

The inventive compositions obtained in the Examples were compared with the products prepared in Comparative Examples and commercially available products. The experiments were performed according to the following methods: (1) The powdery color of the pigments obtained in Examples and Comparative Examples was measured using a color measuring meter (Sigma 80, manufactured by Nippon Denshoku Ind. Co., Ltd). The results are shown in table 1. All of H.V.C in Table 1 are shown by Munsell expression.

TABLE 1

| | Hue (H) | Value (V) | Chroma (C) | Color* conc. ($Q_T$) |
|---|---|---|---|---|
| Example 1 | 1.00 R | 4.65 | 13.87 | 13.26 |
| Comparative Example 1 | 8.21 RP | 5.36 | 11.05 | 5.21 |
| Comparative Example 10 | 9.78 Y | 8.41 | 0.79 | 0.34 |
| Comparative Example 11 | 5.3 RP | 6.22 | 12.38 | 2.94 |
| Example 2 | 1.35 R | 5.04 | 12.60 | 9.47 |
| Comparative Example 2 | 8.71 RP | 5.46 | 9.56 | 4.62 |
| Example 3 | 4.80 R | 5.28 | 10.57 | 8.09 |
| Comparative Example 3 | 3.59 R | 6.03 | 7.14 | 3.30 |
| Example 4 | 8.37 R | 4.77 | 9.83 | 9.59 |
| Comparative Example 4 | 3.02 R | 5.63 | 6.30 | 3.94 |
| Product A | 7.38 RP | 5.37 | 8.49 | 4.42 |
| Product B | 1.16 R | 4.58 | 6.85 | 8.26 |
| Product C | 1.6 R | 6.15 | 8.44 | 3.06 |
| Product D | 67.15 | 6.54 | 9.23 | 2.43 |
| Example 5 | 3.68 Y | 8.05 | 10.76 | 6.68 |
| Comparative Example 5 | 3.06 Y | 7.71 | 7.22 | 3.06 |
| Comparative Example 12 | 8.43 YR | 8.13 | 0.19 | 0.39 |
| Example 6 | 4.22 PB | 8.13 | 0.19 | 0.39 |
| Comparative Example 6 | 9.59 B | 4.75 | 6.53 | 6.17 |
| Comparative Example 13 | 5.90 Y | 8.48 | 1.07 | 0.34 |
| Example 7 | 7.80 BG | 4.04 | 4.96 | 11.99 |
| Comparative Example 7 | 1.98 B | 4.68 | 3.84 | 6.65 |
| Comparative Example 14 | 5.45 YR | 8.46 | 1.24 | 0.30 |
| Example 8 | 3.72 R | 4.90 | 12.29 | 11.16 |
| Product E | 9.80 RP | 5.68 | 6.23 | 3.56 |

TABLE 1-continued

| | Hue (H) | Value (V) | Chroma (C) | Color* conc. ($Q_T$) |
|---|---|---|---|---|
| Example 9 | 7.79 RP | 4.51 | 14.23 | 12.40 |
| Product F | 3.01 RP | 5.14 | 9.44 | 4.42 |

*Color conc. ($Q_T$) is calculated according to Dyeing & Finishing 25, 779, 1973.

(2) Each nacreous pigment was applied on to a black-white matching paper using 0.101 mm applicator to prepare a color film of 0.1 g/5 g VS medium (manufactured by Dainichi Seika Color & Chemicals Mfg. Co., Ltd.). The color of the pigments was measured in the condition of an incident angle of 45° and a viewing angle of 0° using a transition angle spectrophotometer (CMS1200 manufactured by Murakami Color Research institute). The results are shown in Table 2.

TABLE 2

| | White ground | | | Black ground | | |
|---|---|---|---|---|---|---|
| | Hue (H) | Value (V) | Chroma (C) | Hue (H) | Value (V) | Chroma (C) |
| Example 1 | 5.3 RP | 7.20 | 7.10 | 5.4 P | 1.46 | 2.73 |
| Comparative Example 1 | 6.8 RP | 6.78 | 6.86 | 9.6 P | 2.32 | 1.43 |
| Comparative Example 8 | 4.6 RP | 7.65 | 6.30 | 3.5 RP | 1.93 | 3.05 |
| Comparative Example 9 | 5.8 RP | 7.61 | 5.19 | 2.7 P | 3.60 | 0.99 |
| Comparative Example 10 | 3.6 GY | 8.90 | 0.79 | 1.8 RP | 1.90 | 2.23 |
| Product A | 2.3 R | 7.77 | 2.96 | 0.7 RP | 1.48 | 1.70 |
| Product B | 8.0 R | 6.45 | 5.26 | 9.9 RP | 1.81 | 2.86 |
| Product C | 1.1 R | 6.58 | 8.71 | 4.6 RP | 2.50 | 1.18 |
| Product D | 0.8 R | 6.98 | 7.44 | 3.1 RP | 2.64 | 0.82 |
| Example 5 | 6.1 Y | 8.50 | 4.60 | 6.2 Y | 2.72 | 3.42 |
| Comparative Example 5 | 4.3 Y | 8.30 | 4.74 | 5.9 GY | 3.16 | 1.14 |
| Comparative Example 12 | 6.7 GY | 8.62 | 0.17 | 4.0 Y | 3.19 | 2.32 |
| Example 6 | 5.6 B | 6.11 | 6.67 | 5.6 PB | 1.18 | 5.68 |
| Comparative Example 6 | 5.1 B | 7.03 | 4.23 | 7.7 B | 3.03 | 3.55 |
| Comparative Example 13 | 4.0 Y | 8.89 | 1.24 | 5.4 PB | 1.87 | 4.78 |

(3) The color of the same samples are used in (2) were measured in the condition of an incident angle of 45° and a viewing angle of 0° using the same instruments as in (2) (Filter:3/10). The results are shown in Table 3.

TABLE 3

| | White ground | | | Black ground | | |
|---|---|---|---|---|---|---|
| | Hue (H) | Value (V) | Chroma (C) | Hue (H) | Value (V) | Chroma (C) |
| Example 1 | 4.6 RP | 5.26 | 6.57 | 4.3 RP | 3.62 | 6.79 |
| Comparative Example 1 | 0.5 RP | 6.85 | 4.42 | 4.4 RP | 5.99 | 3.20 |
| Comparative Example 8 | 4.8 RP | 5.76 | 5.02 | 5.6 RP | 3.68 | 4.09 |
| Comparative Example 9 | 1.1 RP | 7.03 | 2.36 | 9.1 P | 5.93 | 1.37 |
| Comparative Example 10 | 1.2 R | 6.27 | 2.18 | 5.9 R | 3.69 | 5.12 |
| Product A | 7.1 RP | 5.82 | 4.69 | 6.2 RP | 3.83 | 5.35 |
| Product B | 2.5 R | 5.12 | 5.86 | 8.9 RP | 3.90 | 5.94 |

TABLE 3-continued

|  | White ground | | | Black ground | | |
|---|---|---|---|---|---|---|
|  | Hue (H) | Value (V) | Chroma (C) | Hue (H) | Value (V) | Chroma (C) |
| Product C | 1.5 RP | 6.41 | 4.82 | 1.2 P | 5.74 | 3.47 |
| Product D | 2.9 RP | 6.80 | 4.41 | 3.1 P | 5.58 | 1.93 |
| Example 5 | 4.8 Y | 7.02 | 5.01 | 4.7 Y | 5.36 | 4.91 |
| Comparative Example 5 | 0.5 GY | 7.68 | 1.83 | 1.0 G | 6.26 | 0.95 |
| Comparative Example 12 | 3.7 Y | 7.36 | 2.69 | 4.9 Y | 5.82 | 4.78 |
| Example 6 | 4.1 PB | 4.61 | 8.29 | 7.5 PB | 3.01 | 9.82 |
| Comparative Example 5 | 8.2 B | 6.34 | 4.67 | 8.6 B | 5.69 | 5.24 |
| Comparative Example 13 | 7.7 PB | 6.27 | 4.60 | 6.7 PB | 3.45 | 10.11 |

As shown in Table 1 to 3, both powdery and applied pigments of this invention were found to have higher chroma and color concentration than the Comparative Examples including commercially available pearl agents. The pigments of this invention were also found not to have a deleterious influence on the pearl effect. It was confirmed by observing with a scanning electron microscope that the pigment was uniformly coated on the surface of titanium mica. Further, the pigments of this invention exhibit excellent weatherability below 120° C. and also have a high dissolution resistance.

The nacreous pigment containing a dye according to this invention has an excellent external distinctness and a high color concentration, and does not entail color bleeding when used. The gross pigment of this invention can provide various products with a distinct color and a pearly luster. Such products include cosmetics, paints, plastics, inks, colors, miscellaneous goods for daily use, ornaments, and the like. The nacreous pigment containing a dye, in which the interference color of the nacreous pigment is coincident with the color of an acid dye exhibits externally distinct color and high color concentration, and is thus very useful.

Obviously, numerous modifications and variations of the present invention are possible in light of the above teachings. It is therefore to be understood that within the scope of the appended claims, the invention may be practiced otherwise than as specifically described herein.

What is claimed is:

1. A nacreous pigment containing a dye comprising a nacreous pigment having an interference color which surface is coated with an insoluble salt of an acid dye and a basic aluminum salt.

2. The nacreous pigment containing a dye according to claim 1, wherein said nacreous pigment having an interference color is a mica coated with a metal oxide.

3. A cosmetic composition comprising a nacreous pigment containing a dye, wherein the surface of a nacreous pigment having an interference color is coated with an insoluble salt of an acid dye and a basic aluminum salt.

4. The nacreous pigment containing a dye according to claim 1, wherein said basic aluminum salt is the compounds represented by the following formula:

$$Al_n(OH)_m X_l$$

wherein X represents Cl, Br, I, or $CH_3COO$, and n, m, and l denote numbers satisfying the equation, $3n = m + l$.

5. The nacreous pigment containing a dye according to claim 4, wherein said basic aluminum salt is a member selected from the group consisting of $Al_2(OH)_5Cl$ and $Al(OH)(CH_3COO)_2$.

* * * * *